United States Patent
Karim

(10) Patent No.: US 7,533,382 B2
(45) Date of Patent: May 12, 2009

(54) HYPERPROCESSOR

(75) Inventor: Faraydon O. Karim, San Diego, TX (US)

(73) Assignee: STMicroelectronics, Inc., Carrollton, TX (US)

(*) Notice: Subject to any disclaimer, the term of this patent is extended or adjusted under 35 U.S.C. 154(b) by 569 days.

(21) Appl. No.: 10/283,653

(22) Filed: Oct. 30, 2002

(65) Prior Publication Data

US 2004/0088519 A1    May 6, 2004

(51) Int. Cl.
  G06F 9/46    (2006.01)
  G06F 15/00   (2006.01)
(52) U.S. Cl. .................. 718/100; 712/32; 712/28
(58) Field of Classification Search .......... 718/102, 718/100; 711/8; 712/241, 32, 28
  See application file for complete search history.

(56) References Cited

U.S. PATENT DOCUMENTS

| | | | | |
|---|---|---|---|---|
| 4,333,144 A | * | 6/1982 | Whiteside et al. | 718/102 |
| 4,945,480 A | * | 7/1990 | Clark et al. | 711/6 |
| 4,980,857 A | * | 12/1990 | Walter et al. | 714/45 |
| 5,867,725 A | * | 2/1999 | Fung et al. | 712/23 |
| 6,094,430 A | * | 7/2000 | Hoogenboom | 370/375 |
| 6,279,106 B1 | * | 8/2001 | Roberts | 712/239 |
| 7,162,620 B2 | * | 1/2007 | Magoshi | 712/241 |

OTHER PUBLICATIONS

Tyson, G., et al., "Techniques for Extracting Instruction Level Parallelism on MIMD Architectures," Microarchitecture, 1993, Proceedings of the 26th Annual International Symposium on Austin, Texas, USA, Dec. 1-3, 1993, Los Alamitos, CA, US, IEEE Comput. Soc, US, Dec. 1, 1993, pp. 128-137, XP010097290.
Kasahara, H., et al, "Parallel Processing of Near Fine Grain Tasks Using Static Scheduling on OSCAR (optimally scheduled advanced multiprocessor)", Proceedings of the Supercomputing Conference, New York, Nov. 12-16, 1990, Washington, IEEE Comp. Soc. Press, US, vol. CONF. 3, Nov. 12, 1990, pp. 856-864 XP010020006.
Gehrke, W., et al., "Associative Controlling of Monolithic Parallel Processor Architectures," IEEE Transactions on Circuits and Systems for Video Technology, IEEE Inc., New York, US, vol. 5, No. 5, Oct. 1, 1995, pp. 453-464, XP000535997.

* cited by examiner

*Primary Examiner*—Van H Nguyen
*Assistant Examiner*—Camquy Truong
(74) *Attorney, Agent, or Firm*—Lisa K. Jorgenson; William A. Munck

(57) ABSTRACT

A hyperprocessor includes a control processor controlling tasks executed by a plurality of processor cores, each of which may include multiple execution units, or special hardware units. The control processor schedules tasks according to control threads for the tasks created during compilation and comprising a hardware context including register files, a program counter and status bits for the respective task. The tasks are dispatched to the processor cores or special hardware units for parallel, sequential, out-of-order or speculative execution. A universal register file contains data to be operated on by the task, and an interconnect couples at least the processor cores or special hardware units to each other and to the universal register file, allowing each node to communicate with any other node.

10 Claims, 1 Drawing Sheet

HYPERPROCESSOR

TECHNICAL FIELD OF THE INVENTION

The present invention is directed, in general, to processor design and, more specifically, to high performance processors with high-level multi-threaded parallelism. The invention may be applied to embedded systems as well as general purpose computing.

BACKGROUND OF THE INVENTION

In both embedded systems and general purpose computing, a high demand for computing power exists. This demand will continue to increase with increasing system complexities and the trend to address more and more problems with digital solutions.

One solution to satisfying such demand is the exploitation of instruction level parallelism (ILP) in, for example, very large instruction word (VLIW) processors, single instruction multiple data (SIMD) processors, superscalar processors, and their variants. These approaches are limited by the available parallelism in sequentially written programs. In general, instruction level parallelism has been found not exceed a level of about six instructions per cycle.

Another solution to satisfying processing demand is to write parallel programs for homogeneous or heterogeneous parallel processors. Although practiced for many years, this approach has not achieved wide acceptance due to the complexity of parallel programs, making development extremely costly. The high development cost severely limits the range of applications that may economically employ this approach. In addition, use of heterogenous processors necessitate complete re-writes of the program for each processor configuration, and this type of architecture is typically limited by bandwidth restrictions between processors and memories.

Yet another solution for high-performance systems is pipelining several stages of a computation, and efficient approach that unfortunately lacks flexibility and, more importantly, scalability.

Independently, scheduling of processing for embedded systems using real time operating systems (RTOS) has been found to require significant over-engineering of the hardware necessary to support applications, due to both the overhead introduced by an RTOS and inefficient scheduling by the RTOS.

There is, therefore, a need in the art for an improved processing architecture supporting high processing and communication requirements. It would further be desirable for the architecture to provide a platform of modular component that may be assembled and scaled to meet diverse system requirements. The solution of the present invention involves running sequentially written programs in a manner benefiting from techniques developed for task level parallelism (TLP), with each task benefiting from experience developed in instruction level parallelism to thus benefit from both coarse grain and fine grain parallelism without the need to write parallel programs. Further, the present invention eliminates the need to used RTOS schedulers for task and resource scheduling, and can also organize heterogenous parallel processing in a flexible and scalable way by dynamically combining parallel and pipelined execution.

SUMMARY OF THE INVENTION

To address the above-discussed deficiencies of the prior art, it is a primary object of the present invention to provide, for use in general purpose computers and embedded systems, a hyperprocessor that includes a control processor controlling tasks executed by a plurality of processor cores, each of which may include multiple execution units or special hardware units, a universal register file, and an interconnect that couples the processor cores or special hardware units to each other and to the control processor. The control processor schedules tasks according to control threads for the tasks created during compilation and comprising a hardware context including register files, a program counter and status bits for the respective task. The tasks are dispatched to the processor cores or special hardware units for either parallel or sequential execution.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
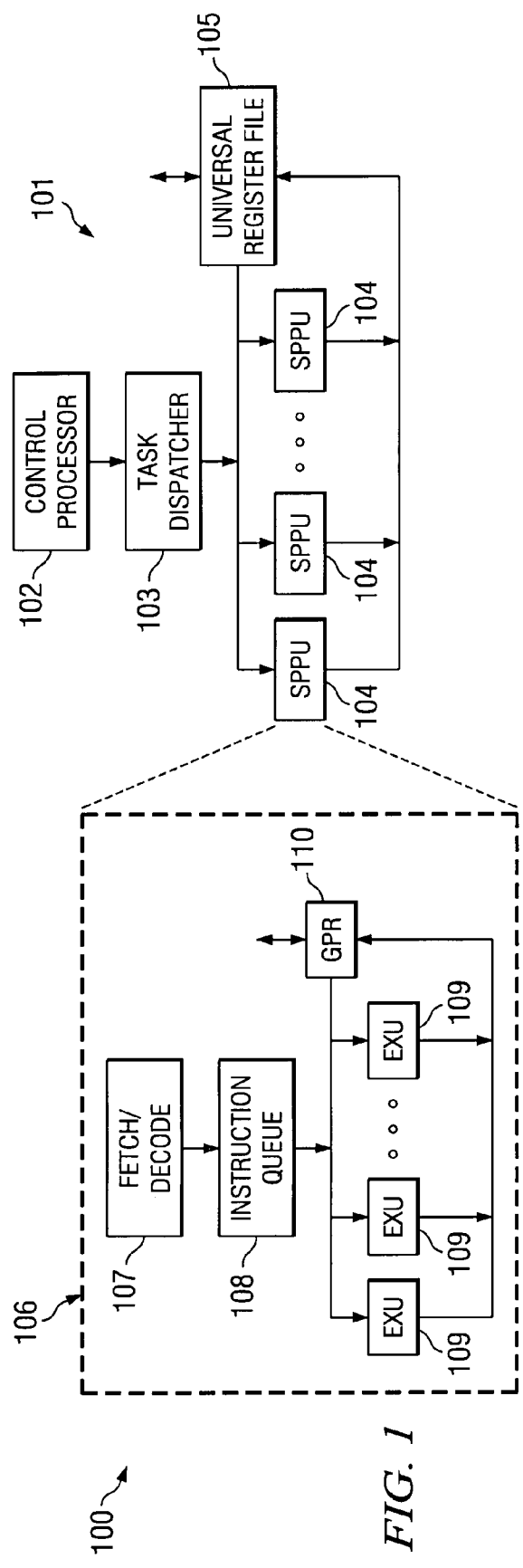
FIG. 1 is a simplified diagram of the macro-and micro-architecture for a hyperprocessor according to one embodiment of the present invention.
Figure 2:
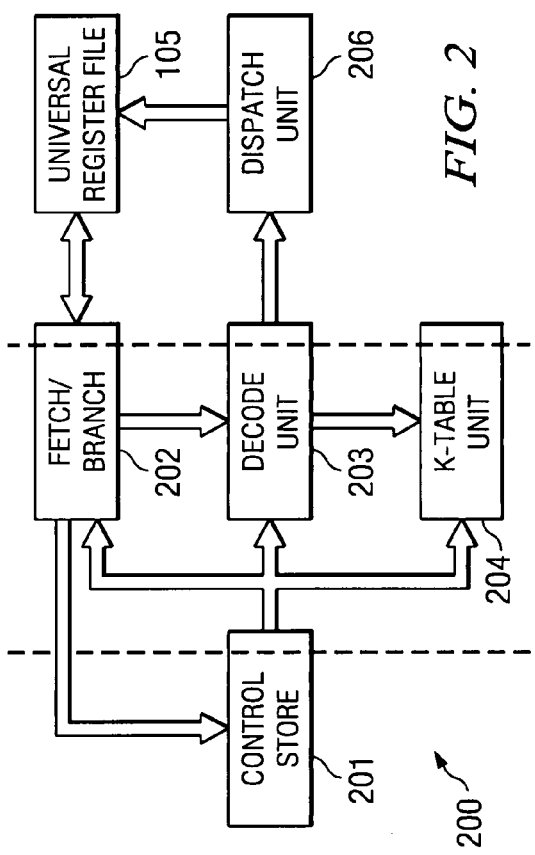
FIG. 2 is a diagram of an exemplary control processor microarchitecture for use in a hyperprocessor according to one embodiment of the present invention.

FIGS. 1 and 2, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIG. 1 is a simplified diagram of the macro-and micro-architecture for a hyperprocessor according to one embodiment of the present invention. Hyperprocessor 100 has a macro-architecture 101 comprising a control processor 102 and a task dispatcher 103, one or more special purpose processing units (SPPUs) 104 and a universal register file (URF) 105. SPPUs may utilize processor or application specific integrated circuit (ASIC) architectures, and may be homogenous (all the same) or heterogenous (different—i.e., a Motion Pictures Expert Group or "MPEG" decoder, a digital signal processor, a Pentium processor, etc.).

The hyperprocessor architecture uses all system components as stages in a sequence of events. Programs are divided into many tasks and subtasks. The tasks and subtasks are executed by system components (SPPUs 104) each according to respective capabilities. As used herein, "tasks" refer to finite sequences of instructions, as opposed to long-lived communicating sequential processes, and with a bounded variation in execution time. These tasks and subtasks are scheduled dynamically by the control processor 102 and/or task dispatcher 103, and dispatched for execution to the system components (SPPUs 104) according to respective capabilities. Once a task is received by an SPPU 104, the SPPU 104 uses an internal program memory system to retrieve the necessary instructions for the assigned task, independent of the remainder of the system 100.

The simple concept underlying the hyperprocessor uses knowledge gained in microprocessor architectures and instruction level parallelism in application at the system level for task level parallelism (and resource optimization) to achieve a program unity. The following simple performance equation illustrates the hyperprocessor architecture:

$$\text{Perfomance} = \left(\frac{\text{Applications}}{\text{Task}}\right) \times \left(\frac{\text{Tasks}}{\text{Processor}}\right) \times \left(\frac{\text{Processors}}{\text{Instruction}}\right) \times \left(\frac{\text{Instructions}}{\text{Cycle}}\right) \times \left(\frac{\text{Cycles}}{\text{Second}}\right).$$

This equation is an oversimplification of much more complicated and interdependent variables. For example, the fourth term on the right side of the equation relates to instructions level parallelism (ILP), or the number of instructions that may be initiated per cycle, a factor dependent on the technology and frequency of the processor, the micro-architecture, the type of instructions being executed and the compiler that issued and optimized the instructions. The remaining terms are similarly complex.

In general, the first two terms on the right in the above equation relate to system level issues, while the remaining three relate to processor issues. The first term relates to the program being executed, and the tasks that may be identified for partitioning of the application according to some desired requirements such as time dependence, resource dependence, or any other logistical requirement. The second term relates to how and when tasks are distributed among various components of the hyperprocessor, a critical issue in program unification, performance achievement, and modularity of system components. The third term relates to utilization of processors or components, while the fourth relates to instruction level parallelism as described above and the fifth is a technology statement of how fast the processor can be run and how much logic may be fit on a die.

Within hyperprocessor 100, once programs are identified and task(s) refined by control processor 102, the tasks are executed in a manner similar to execution of instructions by classical microprocessors. After a super-scalar microprocessor 106 (one of the SPPUs 104 in the exemplary embodiment) fetches and decodes an instruction, the instruction is dispatched to the appropriate execution unit 109, and, at least in dynamic scheduling, the results are collected in a program order. Hyperprocessor 100 does the same to tasks. As soon as the task is fetched from the program memory (which may be distributed among the components of hyperprocessor 100), a determination is made regarding what to do with the task by the control processor 102, then the task is dispatched by task dispatcher 103 to an appropriate component/processor 104 for execution.

The individual SPPU processors 104 may have a superscalar microarchitecture 106 including, for example, an instruction store 107, a fetch/decode unit 108, one or more execution units 109, and a general purpose register (GPR) file 110. When a task is dispatched to a processor 104, that processor will fetch the appropriate instructions from program memory to complete execution. As noted above, these processors 104 need not be homogenous, but instead may be two or more of several different processors or may comprise just specific hardware for one function. As the execution units 109 are subunits within the processor 104, each processor 104 is itself a subunit in the hyperprocessor 100, as shown.

It should be noted that the architecture of hyperprocessor 100 may be nested, with one or more SPPUs 104 having the architecture of a hyperprocessor 100.

Task level parallelism has not previously been successfully implemented for various reasons, including principally data and control dependencies among the tasks. Previous attempts at task level parallelism and speculative multithreading have depended on the old paradigm in microprocessors. Just as a data space (the GPR file) shared by components within a microprocessor supplies all execution units, all processors 104 within hyperprocessor 100 share the universal register file 105. With this space, the hyperprocessor 100 can achieve out-of-order, parallel and speculative task execution. Data caching is supported to alleviate task dependency issues.

The role of universal register file 105 in executing tasks is analogous to the role of a register file 110 in a microprocessor: the universal register file provides a mechanism for communication and synchronization between tasks, just as a general purpose register file provides communication and synchronization in executing instructions.

The universal register file 105 keeps track of which entries are in use by which processor 104 in read or write modes, keeping track of data dependencies. Coherency mechanisms provided by the universal register file 105 improve scalability of parallel execution and therefore enable use of a larger number of SPPUs 104.

As with other components of the hyperprocessor architecture, the universal register file 105 may be implemented differently for different applications since neither the size nor the number of the entries is fixed. In high-performance applications, the universal register file 105 will utilize very fast memory and wide transfers between shared buffers and local caches, while in low-end applications the universal register file 105 may be simply mapped to shared off-chip memory.

In embedded systems, the control processor 102 is aware of the overall system architecture and, in addition to the functions listed above, handles communication transactions between host processors and/or service processor(s) through function calls.

The control processor 102 is capable of running multiple programs by fetching task-level instructions from multiple contexts, simultaneously or sequentially interleaved.

Even though task scheduling in the hyperprocessor 100 is more global than scheduling instructions within microprocessors, many characteristics remain the same. Therefore optimization may usefully be applied to task level parallelism by the control processor 102 and/or task dispatcher 103 in a manner similar to the optimization applied to instruction level parallelism. The task dispatching mechanism operates to get as close as possible to the highest possible throughput.

The implementation of task dispatcher 103 will differ for different applications. For instance, in a network processing core router embedded application, the task dispatcher may be distributed between a central dispatcher and logic within the processors 104 and the universal register file 105, while in a home gateway application the task dispatcher 103 might be a software module in the control processor 102.

The hyperprocessor model allows programming of a highly concurrent machine as one entity, analogous to programming a single central processing unit (CPU). Concurrency is achieved by the use of a number of superscalar processors 104, a central task scheduler (task dispatcher 103) executing a high level program and allocating tasks to the processor(s) 104, which then run the tasks independently. A universal register file 105 holds data shared between tasks running on the processor 104, and serves as the primary means of communication and synchronization.

Parallel processing is bandwidth intensive, resulting in a communications bottleneck. Existing network processors employ communications based on variants of the shared bus or the crossbar switch. However, a shared bus will not scale to handle the bandwidth requirements of future high-performance routers, while the complexity of a crossbar switch becomes prohibitive as the number of processor cores connected increases. Customized interconnects for specific applications is are undesirable because of time and cost implications. Accordingly, embodiments of the hyperprocessor 100 preferably employ the Octagon interconnect, disclosed in U.S. patent application Ser. No. 10/090,899 entitled "OCTAGONAL INTERCONNECTION NETWORK FOR LINKING PROCESSING NODES ON AN SOC DEVICE AND METHOD OF OPERATING SAME" and filed Mar. 5, 2002, now U.S. Pat. No. 7,218,616, which is incorporated herein by reference, to provide the necessary bandwidth for many applications. The interconnect described may be configured between a predetermined number of nodes in a processing system and between every node of the interconnect, with the interconnect capable of selectively communicating with any of the predetermined number of nodes and the interconnect nodes in less than a required number of hops through other nodes of the processing system.

FIG. 2 is a diagram of an exemplary control processor microarchitecture for use in a hyperprocessor according to one embodiment of the present invention. The micro-architecture is parametric driven, with the number of issues and execution units capable of being changed by modifying a few parameters. The processor 200 has an optimized pipeline (early branch detection) and implements hardware multithreading (two full contexts in hardware).

The microarchitecture for processor 200, which may be implemented by any superscalar architecture, is simple, where pipeline stages are denoted by the dashed lines in FIG. 2. The first stage includes a control store 201, which disburses tasks or operations to the second stage and receives branching control signals from the second stage. The second stage is occupied by a fetch/branch unit 202, a decode unit 203, and a K-table unit 204. The fetch/branch unit 202 transmits control signals to the control store 201 and to decode unit 203, which in turn transmits control signals to and receives status data from K-table unit 204.

The third stage includes universal register file 105, bi-directionally coupled to fetch/branch unit 202, and dispatch unit 206, receiving instructions from decode unit 203 and transmitting control signals to register file 205. The dispatch unit 206 sends tasks to SPPUs 104 in the hyperprocessor 100, and receives signals representing the state of the execution of those tasks. When these signals arrive, the K-table unit 204 commits results so as to preserve correctness of execution.

The microarchitecture 200 is simple, handling data dependencies by a combination of register renaming (through K-tables and a scheduling mechanims) and by tagging the registers to indicate whether data available in the universal register file 105 is valid or not. The microarchitecture's early branch detection provides better out-of-order execution. Furthermore, as long as a task's effects are contained within the universal register file 105, squashing a task is simple and efficient, allowing for efficient speculative task execution.

Communication and synchronization between tasks is primarily accomplished via the universal register file 105. Shared global memory for sharing long-term data may also be present, so bottleneck operations such as test-and-set on global memory are unnecessary. The simple hardware-based task scheduling enables the control processor and the task dispatcher to vary the degree of autonomy over scheduling short-lived tasks, an adjustment necessary to accommodate the requirements of different embodiments of the architecture.

The instruction set for microarchitecture 200 should be the minimum needed to run tasks efficiently, which might include specialized instructions for task scheduling, updating, suspending, squashing or restarting tasks, branching, and other control activities, universal register file access, multithreading and conditional instructions. When paired with the universal register file, task-level program segment allocation may be run efficiently on the control processor.

In addition to simplicity (keeping the number of instructions to a minimum), the instructions should be as regular as possible to make decoding easy.

Application specific systems may be easily instantiated using the hyperprocessor platform architecture: the architecture provides a structure—the components of control processor, universal register file, and task dispatcher—to provide control of program flow, together with synchronization and communication between tasks. Thus, instantiation of an application specific system is performed by choosing the appropriate number and mix of SPPUs, and by scaling the configurable control processor, universal register file, and dispatcher.

The hyperprocessor architecture of the present invention is versatile and scalable, amenable to insertion in applications such as graphics subsystems, home gateways, edge/core routers, and web switches, to name just a few. The hyperprocessor combines the high-performance associated with ASICs with the programmability of processors, extending that programmability to a new level by making configuration application developer-friendly. The hyperprocessor platform allows for development of a family of products to accommodate many combinations of applications and performance requirements. For instance, varying the number of SPPUs, adding/removing special hardware units, or changing the size of the universal register file are all straightforward. While the building blocks vary, the hardware and software architectures remain the same.

The hyperprocessor provides a platform to harness the power of heterogenous computing elements in a manner making design space exploration fast and efficient, and provides several critical blocks including on-chip interconnect, dedicated processors, and the control processor. The hyperprocessor also provides a scalable system-on-chip (SoC) platform architecture that is easy to program and debug, with increased parallelism options, out-of-order and speculative task execution, and program memory distribution, all available for an application to improve performance.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. An embedded processing system comprising:
    a plurality of processor cores or special hardware units for executing tasks;
    a control processor controlling tasks executed by the plurality of processor cores or special hardware units;
    a task dispatcher dispatching tasks to the plurality of processor cores or special hardware units according to scheduling by the control processor;
    a universal register file containing data to be processed by tasks executed by the plurality of processor cores or special hardware units; and
    an interconnect coupling the plurality of processor cores or special hardware units and the universal register file,
    wherein the interconnect is configured between a predetermined number of nodes in a processing system and between every node of the interconnect, wherein the interconnect is capable of selectively communicating with any of the predetermined number of nodes and the interconnect nodes in less than a required number of hops through other nodes of the processing system.

2. The system according to claim 1, wherein each task comprises a finite sequence of instructions with a bounded variation in execution time.

3. The system according to claim 1 wherein the task dispatcher transmits tasks to the plurality of processor cores or special hardware units for selectively either parallel or sequential execution by the one or more processor cores or special hardware units.

4. The system according to claim 1, wherein the access to data within the universal register file may be selectively shared among the plurality of processor cores or special hardware units or exclusive to a single processor core or special hardware unit.

5. A method of executing a program in an embedded processing system comprising:
    scheduling tasks for execution by a plurality of processor cores or special hardware units;
    controlling tasks executed by the plurality of processor cores or special hardware units using a control processor;
    dispatching the tasks to the plurality of processor cores or special hardware units according to scheduling by the control processor; and
    storing data to be processed by tasks executed by the plurality of processor cores or special hardware units in a universal register file; and
    coupling the plurality of processor cores or special hardware units and the universal register file with an interconnect,
    wherein the interconnect is configured between a predetermined number of nodes in a processing system and between every node of the interconnect, wherein the interconnect is capable of selectively communicating with any of the predetermined number of nodes and the interconnect nodes in less than a required number of hops through other nodes of the processing system.

6. The method according to claim 5, wherein the tasks are dispatched from an instruction memory distributed across the plurality of processor cores or special hardware units.

7. The method according to claim 5, wherein the tasks are selectively scheduled for either parallel or sequential execution by the plurality of processor cores or special hardware units.

8. The method according to claim 5, wherein the tasks are selectively scheduled for either out-of-order or speculatively while preserving correctness of a sequentially specified program including the tasks.

9. The method according to claim 5, wherein the tasks are selectively scheduled for parallel, pipelined, or mixed execution.

10. The method according to claim 5, wherein tasks for multiple programs are scheduled by fetching task-level instructions from multiple contexts, simultaneously or sequentially interleaved.

* * * * *